United States Patent [19]

Harmand

[11] 4,374,497
[45] Feb. 22, 1983

[54] LEVELING TABLE

[76] Inventor: Pierre Harmand, 9 Rue Malaz, F-74600 Seynod, France

[21] Appl. No.: 214,000

[22] PCT Filed: Dec. 13, 1979

[86] PCT No.: PCT/FR79/00125
§ 371 Date: Sep. 8, 1980
§ 102(e) Date: Sep. 8, 1980

[87] PCT Pub. No.: WO80/01366
PCT Pub. Date: Jul. 10, 1980

[30] Foreign Application Priority Data
Jan. 8, 1979 [FR] France .............................. 79 00311

[51] Int. Cl.³ ............................................. A47F 5/12
[52] U.S. Cl. ........................................ 108/4; 108/147; 248/163 R; 248/421
[58] Field of Search .......................... 108/4, 147, 144; 248/163, 161, 421, 411, 371; 269/294, 321, 289 R; 408/89, 90, 91

[56] References Cited
U.S. PATENT DOCUMENTS

| | | | |
|---|---|---|---|
| 657,033 | 8/1900 | Sanford | 108/4 |
| 2,464,690 | 3/1949 | Ketchem | 108/4 X |
| 2,686,095 | 8/1954 | Carlson | 108/4 |
| 2,944,858 | 7/1960 | Engelstead | 108/4 |
| 3,229,941 | 1/1966 | Suliteanu et al. | 248/163 |
| 3,288,421 | 11/1966 | Peterson | 108/4 X |
| 3,515,391 | 11/1970 | Storm | 108/4 |
| 4,095,770 | 6/1978 | Long | 248/371 |

FOREIGN PATENT DOCUMENTS 14325 of 1884 United Kingdom ............... 248/371

Primary Examiner—James T. McCall
Attorney, Agent, or Firm—Spencer & Kaye

[57] ABSTRACT

A balanced adjustable support in which the plane of the support surface for an object or piece to be machined can be altered with great precision. The adjustable support comprises a table, a base, a central leg rigidly fixed to the base and jointed to the underside of the table, and four corner telescopic legs, the length of which is adjustable by means of a pneumatic jack. Each end of each of the legs is fixed to the base and to the underside of the table with a ball and socket joint immobilized by means of a pneumatic joint.

6 Claims, 2 Drawing Figures

4,374,497

LEVELING TABLE

BACKGROUND OF THE INVENTION

The present invention relates to a balanced adjustable support or table, in particular a working table of which the plane of the support surface for an object or piece to be machined can be altered with great precision while maintaining the equilibrium of the table irrespective of the load.

Working tables can generally be displaced in two planes by conventional mechanical means such as screws and guide rods. A wedge can be inserted between the table and the piece to be machined which enables the piece to be inclined. The large number of selective mountings required renders the use of universal machines expensive.

U.S. Pat. No. 2,686,095 in the name of Carlson discloses a table for working construction stones, comprising a fixed base, a plate rotatable about the base and being fixed in a predetermined angular position, and a universal joint disposed between the plate and the table which is connected with the plate by four telescopic legs by means of hook and ring assemblies. A change of inclination is achieved by means of capstans and cables.

Although such a device can give acceptable results for the machining of stone which requires a precision rarely exceeding one centimeter, it is a different story for a machine requiring a precision in the order of one micron.

SUMMARY OF THE INVENTION

The object of the invention is to provide a balanced adjustable table which enables to be positioned thereon with great precision in a desired plane an object to be machined while only exerting a slight pressure on the table.

As the object or piece to be machined can be locked in the desired plane there is no need to turn to complex mountings. According to the invention the adjustable support or table for supporting the object or the piece to be machined can be placed in a predetermined exact position and remain therein for a certain period of time, and comprises a fixed base, a table providing a surface for supporting or maintaining the object or the piece, a central, vertical leg which is rigidly fixed to the base and the upper end of which is jointed to the table by means of a cardan type joint, and lateral legs comprising telescopic elements the ends of which are provided with a ball-head enabling them to be jointed to either the base or the table by means of a fixed seat, the ends of each of the legs being provided with temporary fastening means for each of the ball-heads in regard to its fixed seat.

BRIEF DESCRIPTION OF THE DRAWINGS

Other details and advantages of the invention will be apparent from the description and the claims which follow, and from the drawings in which:

DESCRIPTION OF THE PREFERRED EMBODIMENT

Figure 1:
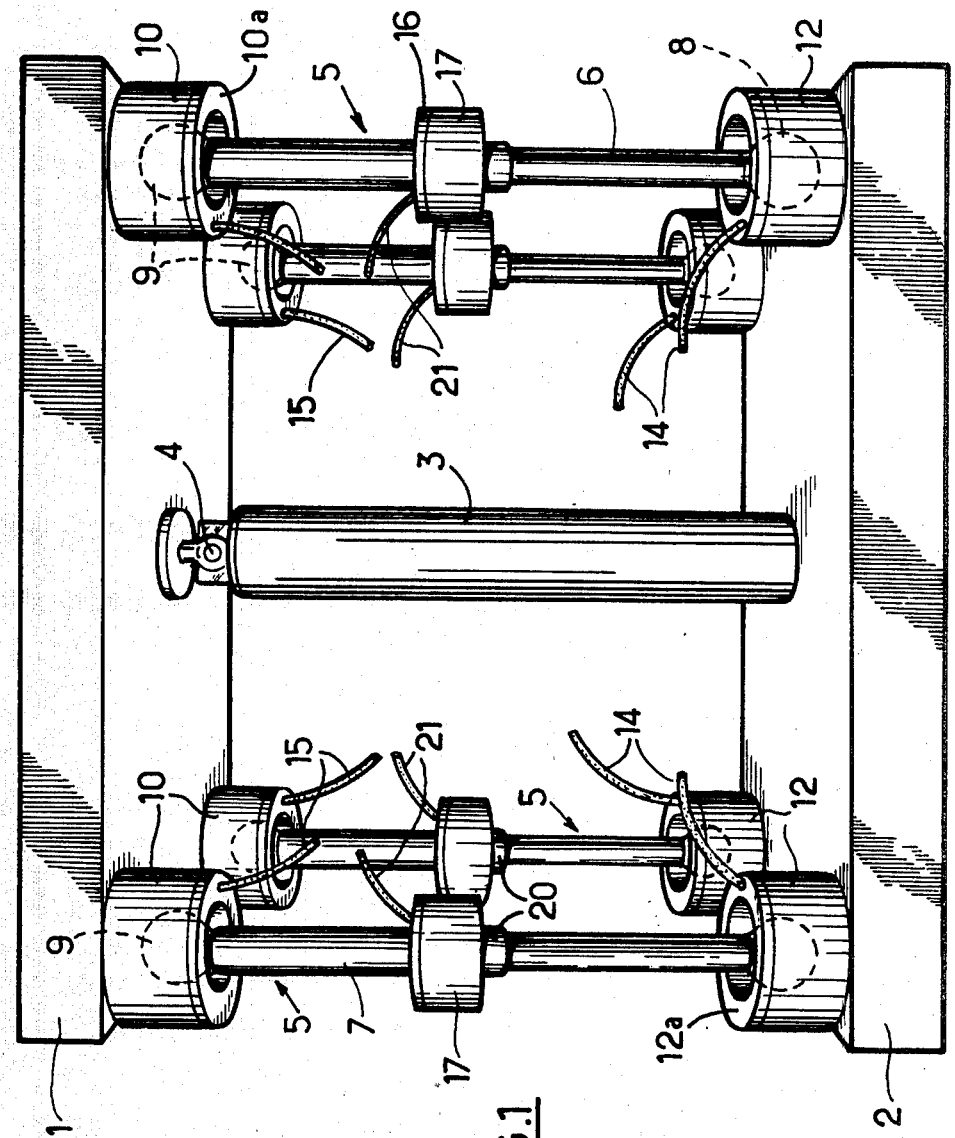
FIG. 1 is a perspective view of a table of the invention.

In FIG. 1 the support of the invention comprises a table 1 which forms the support surface for an object or a piece to be machined, a base 2, and a central leg 3 rigidly fixed to the base 2 and jointed to the underside of the table 1 by means of a universal joint 4. Universal joint 4 comprises an upper part 4a secured to the underside of table 1 and a lower part 4b fixed to the central leg 3, the upper part 4a being rotatable with respect to lower part 4b about two perpendicular axes in the horizontal plane. Four legs 5 disposed at the four corners of the table and the base, extension means and locking means will be described with reference to FIG. 2.

Each of the lateral legs 5 comprises two telescopic tubular members, namely an internal tubular member 6 and an external tubular member 7. The lower end of the internal tubular member is integral with a ball-head 8 whereas the upper end of the external tubular member is integral with a ball-head 9. A cylinder 10 having a locking piston 11 slidable therein forms, together with a bottom part 10a, an upper pneumatic jack and is fixedly connected with table 1. Likewise, a cylinder 12 having a locking piston 13 slidable therein forms, together with an extremity 12a, a lower pneumatic jack and is fixedly connected to the base 2. The two cylinders comprise a spherical seat $10^b$, $12^b$ for cooperating with an adjacent ball-head.

Because of the shape of the bore of the piston it is obvious that when air is admitted through pipe lines 14 and 15 the ball-head is fixed in a respective seat and is locked therein.

The relative movement between the telescopic tubular members can be stopped in the following manner:

The external tubular member 7 is integral with an extremity 16 of a cylinder 17 and a pneumatic jack having a piston 18. The piston 18 comprises a conical bore 18a for cooperating with externally conical bits 19. A shoulder 20 completes the jack.

When air is introduced through pipe line 21 the piston 18 moves the bits 19 against the internal tubular member 6 and consequently stops it relative to the external tubular member 7.

Figure 2:
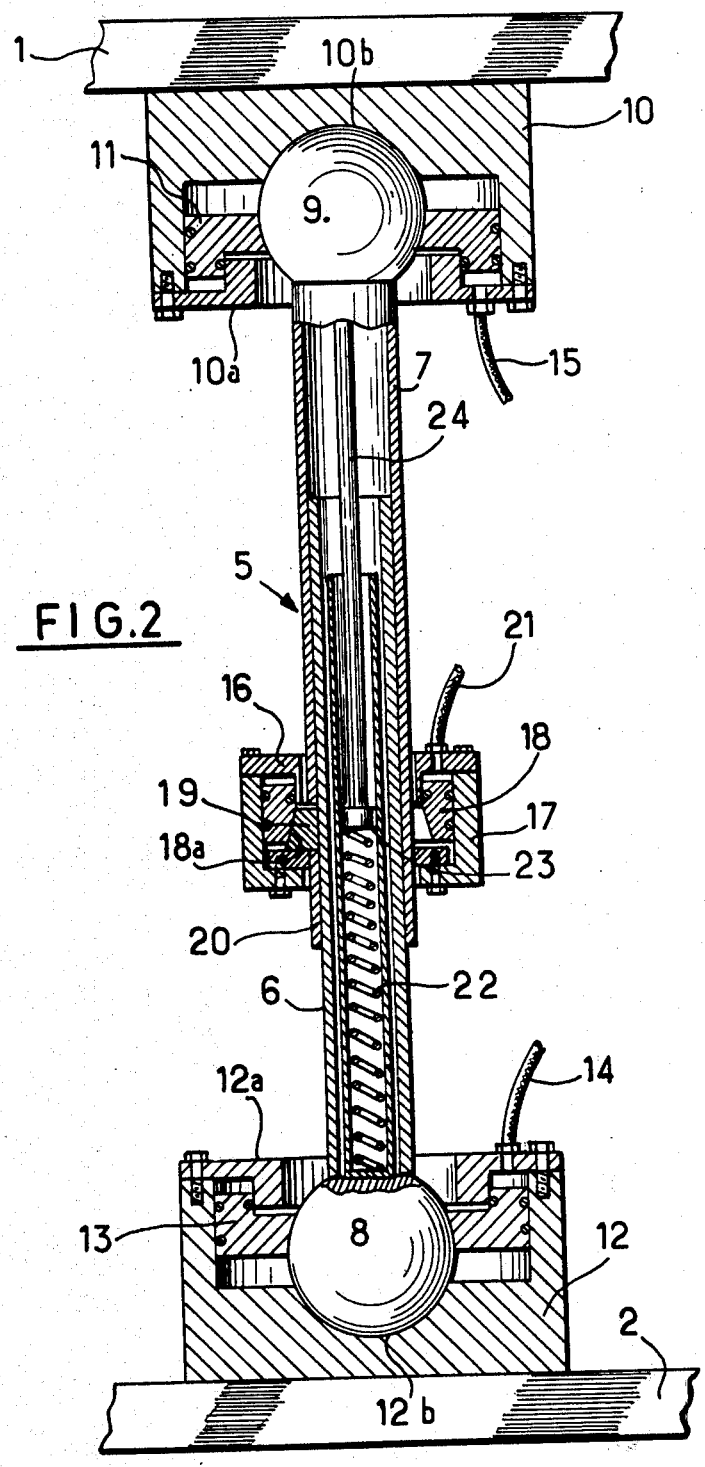
FIG. 2 is a section in elevation of an external leg.

It should be noted that the seats $10^b$ and $12^b$ are permanently in contact with the ball-heads 9 and 8 respectively by the action of a load compensating device of a conventional type, either a so-called pneumatic spring such as that sold under the trade name LIFT-O-MAT which acts as a pneumatic jack having a closed gas circuit, or a device as shown in FIG. 2 comprising a loaded spring 22 enclosed inside the tubular member 6 under a load compensating piston 23 which is connected to the ball-head 9 by a rod 24.

The load of the spring 22 or the initial pressure of an equivalent hydraulic spring is proportional to the load envisaged. The table is now balanced.

If a load is placed on the table it is possible, by the application of a slight pressure thereon, to position the table in any desired plane by means of the legs on the ball-heads and the sliding motion of the tubular members. The four mechanical or pneumatic springs which are distributed on the four legs enable initial setting of the table and its load irrespective of its inclination, thereby avoiding uncontrolled swaying and tipping of the assembly.

Once the required inclination is obtained it is sufficient to supply the jacks 10, 11 or 12, 13 with compressed air thus enabling locking of the ball-heads, on the one hand, and of the sliding motion of both the tubular members, on the other hand. Due to a common compressed air supply this operation acts automatically on all four legs.

The device of the invention can be used in all cases in which precise work has to be carried out at a particular angle, especially in industry, in the medical field and in laboratories. Particularly interesting applications occur in precision machining such as adjustments, laser work, welding and various investigations.

The claims defining the invention are as follows:

1. An adjustable support for positioning an object in an exact predetermined position and maintaining it in said position, comprising:
    a fixed substantially horizontal base;
    a table having a lower surface and an upper surface, said upper surface supporting said object;
    a vertical leg having one end rigidly fixed to said base and the other end attached by a universal joint to the central portion of the lower surface of said table, said table being movable with respect to said vertical leg;
    a plurality of lateral legs, each of said lateral legs comprising first and second telescoping elements having ball-heads at the ends thereof;
    a first plurality of fixed seats secured to said base, each of said first plurality of seats receiving a ball-head of one of said first telescoping elements, said first plurality of fixed seats being spaced about said vertical leg;
    a second plurality of fixed seats secured to the lower surface of said table, each of said second plurality of seats receiving a ball-head of one of said second telescoping elements and being located opposite a corresponding seat of said first plurality of fixed seats; and
    a plurality of locking pistons each slidably positioned with a respective one of said first and second pluralities of fixed seats adjacent the ball-head received within said seat, each of said locking pistons being pneumatically actuatable to lock said ball-head within its corresponding seat.

2. An adjustable support according to claim 1 wherein all of said plurality of locking pistons are simultaneously pneumatically actuated.

3. An adjustable support according to claim 1 or 2 wherein each of said telescoping elements is hollow, and wherein a load compensating device is located within the telescoping elements comprising each of said lateral legs, said load compensating device fixing the ball-heads associated with said telescoping elements in their respective seats when the respective locking pistons are not pneumatically actuated to lock said ball-heads.

4. An adjustable support according to claim 3 wherein said load compensating device comprises a rod positioned within one of the hollow telescoping elements comprising each of said lateral legs, said rod having one end integral with the ball-head associated with said one telescoping element and the other end having a load compensating piston secured thereto, said load compensating device further including pressure generating means located within the other hollow telescoping element comprising said lateral leg for exerting pressure on said compensating piston and the ball-head associated with said other telescoping element.

5. An adjustable support according to claim 3 wherein said pressure generating means is a spring held under pressure between said load compensating piston and the ball-head associated with said other telescoping element.

6. An adjustable support according to claim 1 wherein each of said lateral legs further comprises
    a cylinder integral with said first telescopic element, said first telescopic element being external to said second telescopic element and slidable with respect thereto;
    a plurality of bit members having conical surfaces, said bit members occupying the external surface of said second telescopic element;
    a further piston interposed between said cylinder and said bit members, said further piston having a conical bore complementary to the conical surfaces of said bit members;
    fluid means for displacing said piston with respect to said cylinder and said bit members for immobilizing said first and second telescopic elements with respect to each other; and
    abutment means for preventing non-radial displacement of said bit members when said piston is displaced by said fluid means.

* * * * *